United States Patent
Mohanty et al.

(10) Patent No.: US 11,775,894 B2
(45) Date of Patent: Oct. 3, 2023

(54) INTELLIGENT ROUTING FRAMEWORK

(71) Applicant: Dell Products L.P., Round Rock, TX (US)

(72) Inventors: Bijan Kumar Mohanty, Austin, TX (US); Nanjundaiah Champakadhama Swamy Shreeram, Bangalore (IN); Manasa Kaushik Panduranga, Bangalore (IN); Harish Mysore Jayaram, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 17/237,482

(22) Filed: Apr. 22, 2021

(65) Prior Publication Data
US 2022/0343257 A1 Oct. 27, 2022

(51) Int. Cl.
*G06Q 10/0631* (2023.01)
*G06F 40/30* (2020.01)
*G06N 5/04* (2023.01)
*G06N 20/00* (2019.01)

(52) U.S. Cl.
CPC ..... *G06Q 10/063112* (2013.01); *G06F 40/30* (2020.01); *G06N 5/04* (2013.01); *G06N 20/00* (2019.01)

(58) Field of Classification Search
CPC ............. G06Q 10/063112; G06F 40/30; G06F 40/216; G06F 40/284; G06N 20/00; G06N 5/04
See application file for complete search history.

(56) References Cited

U.S. PATENT DOCUMENTS

| 11,037,079 | B2 * | 6/2021 | Hancock | G06Q 50/2057 |
| 11,508,372 | B1 * | 11/2022 | Schwartz | G10L 15/1822 |
| 2017/0140322 | A1 * | 5/2017 | Kozloski | G06N 5/043 |
| 2018/0341903 | A1 * | 11/2018 | Keen | G06N 20/00 |
| 2019/0121855 | A1 * | 4/2019 | Alexander | G06F 16/248 |
| 2020/0285569 | A1 * | 9/2020 | Tung | G06F 11/368 |
| 2020/0394592 | A1 * | 12/2020 | Shi | G06N 20/00 |
| 2022/0318698 | A1 * | 10/2022 | Matsuoka | G06Q 10/0633 |

OTHER PUBLICATIONS

Wikipedia, "Natural-language Generation," https://en.wikipedia.org/w/index.php?title=Natural-language_generation&oldid=983323430, Oct. 13, 2020, 7 pages.
Wikipedia, "Natural Language," https://en.wikipedia.org/w/index.php?title=Natural_language&oldid=977532848, Sep. 9, 2020, 3 pages.

* cited by examiner

*Primary Examiner* — Dylan C White
(74) *Attorney, Agent, or Firm* — Ryan, Mason & Lewis, LLP

(57) ABSTRACT

A method comprises receiving at least one natural language input corresponding to at least one task, and analyzing the at least one natural language input using one or more machine learning models to determine one or more parameters of the at least one task. One or more skills and/or availabilities of respective ones of a plurality of resources are identified. The method further comprises identifying at least a subset of the plurality of resources to perform the at least one task based at least in part on the one or more parameters and on the one or more skills and/or the availabilities. The at least one task is routed to one or more resources of the subset.

20 Claims, 18 Drawing Sheets

| DIALOG | INTENT |
|---|---|
| My laptop gives me a blue screen. | support.assist.consumer |
| Need a project manager for enterprise storage installation and deployment | service.enterprise.install |
| Need a development resource for the monitoring project | it.development.project |

FIG. 3

```
# Import necessary libraries including NLTK for text pre-processing,
LancasterStemmer for stemming
# and Keras for Tokenization and creating a Bi-LSTM model for intent
analysis and classification
import numpy as np
import pandas as pd
from nltk.corpus import stopwords
from nltk.tokenize import word_tokenize
from nltk.stem.lancaster import LancasterStemmer
import nltk
import re
from sklearn.preprocessing import OneHotEncoder
import matplotlib.pyplot as plt
from keras.preprocessing.text import Tokenizer
from keras.preprocessing.sequence import pad_sequences
from keras.utils import to_categorical
from keras.models import Sequential, load_model
from keras.layers import Dense, LSTM, Bidirectional, Embedding, Dropout
from keras.callbacks import ModelCheckpoint
```

FIG. 5

```
# Load the corpus data and start text pre-processing
def load_dataset(filename):
    df = pd.read_csv(filename, encoding = "latin1", names = ["Sentence", "Intent"])
    print(df.head())
    intent = df["Intent"]
    unique_intent = list(set(intent))
    sentences = list(df["Sentence"])

return (intent, unique_intent, sentences)

intent, unique_intent, sentences = load_dataset("IntentClassification_data.csv")
print(sentences[:5])

nltk.download("stopwords")
nltk.download("punkt")

#define stemmer
stemmer = LancasterStemmer()
```

FIG. 5 (cont'd)

```
# Pre-processing of text by removing unnecesary characters by regular expression
def cleaning(sentences):
    words = []
    for s in sentences:
        clean = re.sub(r'[^ a-z A-Z 0-9]', " ", s)
        w = word_tokenize(clean)
        #stemming
        words.append([i.lower() for i in w])
    return words cleaned_words = cleaning(sentences)
print(len(cleaned_words))
print(cleaned_words[:2])

# String Tokenization done before NLP analysis
def create_tokenizer(words, filters = '!"#$%&()*+,-./:;<=>?@[\]^_`{|}~'):
    token = Tokenizer(filters = filters)
    token.fit_on_texts(words)
    return token
```

FIG. 5 (cont'd)

```
def max_length(words):
    return(len(max(words, key = len)))
word_tokenizer = create_tokenizer(cleaned_words)
vocab_size = len(word_tokenizer.word_index) + 1
max_length = max_length(cleaned_words)

print("Vocab Size = %d and Maximum length = %d" % (vocab_size, max_length))

def encoding_doc(token, words):
    return(token.texts_to_sequences(words))
encoded_doc = encoding_doc(word_tokenizer, cleaned_words)

def padding_doc(encoded_doc, max_length):
    return(pad_sequences(encoded_doc, maxlen = max_length, padding = "post"))
padded_doc = padding_doc(encoded_doc, max_length)

#tokenizer with filter changed
output_tokenizer = create_tokenizer(unique_intent, filters = '!"#$%&()*+,-/:;<=>?@[\]^`{|}~')
encoded_output = encoding_doc(output_tokenizer, intent)

encoded_output = np.array(encoded_output).reshape(len(encoded_output), 1)
```

FIG. 5 (cont'd)

```
def one_hot(encode):
    o = OneHotEncoder(sparse = False)
    return(o.fit_transform(encode))
output_one_hot = one_hot(encoded_output)

from sklearn.model_selection import train_test_split
train_X, val_X, train_Y, val_Y = train_test_split(padded_doc,
output_one_hot, shuffle = True, test_size = 0.2)

def create_model(vocab_size, max_length):
    model = Sequential()
    model.add(Embedding(vocab_size, 128, input_length = max_length,
trainable = False))
    model.add(Bidirectional(LSTM(128)))
    model.add(Dense(32, activation = "relu"))
    model.add(Dropout(0.5))
    model.add(Dense(21, activation = "softmax"))
    return model
```

FIG. 5 (cont'd)

```
# bi-LSTM Neural Network model is created
model = create_model(vocab_size, max_length)

model.compile(loss = "categorical_crossentropy", optimizer = "adam",
metrics = ["accuracy"])
moedel.summary()

filename = 'model.h5'
checkpoint = ModelCheckpoint(filename, monitor='val_loss', verbose=1,
save_best_only=True, mode='min')

hist = model.fit(train_X, train_Y, epochs = 100, batch_size = 32,
validation_data = (val_X, val_Y), callbacks = [checkpoint])
model = load_model("model.h5")

def predictions(text):
    clean = re.sub(r'[^ a-z A-Z 0-9]', " ", text)
    test_word = word_tokenize(clean)
    test_word = [w.lower() for w in test_word]
    test_ls = word_tokenizer.texts_to_sequences(test_word)
    print(test_word)
    #Check for unknown words
    if [] in test_ls:
        test_ls = list(filter(None, test_ls))

test_ls = np.array(test_ls).reshape(1, len(test_ls))
```

FIG. 5 (cont'd)

```
x = padding_doc(test_ls, max_length)

pred = model.predict_proba(x)
return pred def get_final_output(pred, classes):
    predictions = pred[0]

classes = np.array(classes)
    ids = np.argsort(-predictions)
    classes = classes[ids]
    predictions = -np.sort(-predictions)

for i in range(pred.shape[1]):
        print("%s has confidence = %s" % (classes[i], (predictions[i])))

text = "Am I entitled to a new Laptop?"
pred = predictions(text)
get_final_output(pred, unique_intent)
```

FIG. 5 (cont'd)

```
# Import necessary libraries
import numpy as np
import pandas as pd
import sklearn
from nltk.corpus import stopwords
from sklearn.feature_extraction.text import TfidfVectorizer
from sklearn.metrics.pairwise import cosine_similarity
from sklearn.metrics.pairwise import linear_kernel
from scipy.stats import pearsonr import historical work item data
df_attributes = pd.read_csv('data/historical_workItem.csv', index_col=0)

df_attributes.head()

df_attributes['all_content'] = df_attributes['operating_system']+
df_attributes['version_number'] + df_attributes['security_patch'] +
df_attributes['resolution']
```

FIG. 7

```
# Use tf-idf vectorizer to encode/vectorize the content
tf_vectorizer = TfidfVectorizer(analyzer='word', ngram_range=(1, 3),
min_df=0, stop_words='english')
tfidf_all_content = tf_vectorizer.fit_transform(df_attributes['all_content'])

tfidf_all_content_array = tfidf_all_content.toarray()

def recommend_pearson(incident_content):
    correlation = []
    for i in range(len(tfidf_all_content_array)):
        correlation.append(pearsonr(incident_content,
tfidf_all_content_array[i])[0])
    correlation = list(enumerate(correlation))
    sorted_corr = sorted(correlation, reverse=True, key=lambda x: x[1])[1:6]
    resolution_index = [i[0] for i in sorted_corr]
    return df_attributes.iloc[resolution_index]
```

FIG. 7 (cont'd)

INTELLIGENT ROUTING FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to a framework for assignment of tasks to resources in such information processing systems.

BACKGROUND

Organizations generate a significant amount of work based on various organizational activities. The work is typically performed by resources from, for example, resource pools, wherein the resources have varying skill levels. The work performed by the resources may include various tasks performed for customers or other users of the organization.

Conventional techniques for assigning resources to perform organizational tasks lack efficiency and fail to adequately account for availability and skills of the resources, resulting in delays, errors and unwanted costs.

SUMMARY

Illustrative embodiments provide techniques to use machine learning to assign tasks to resources.

In one embodiment, a method comprises receiving at least one natural language input corresponding to at least one task, and analyzing the at least one natural language input using one or more machine learning models to determine one or more parameters of the at least one task. One or more skills and/or availabilities of respective ones of a plurality of resources are identified. The method further comprises identifying at least a subset of the plurality of resources to perform the at least one task based at least in part on the one or more parameters and on the one or more skills and/or the availabilities. The at least one task is routed to one or more resources of the sub set.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts a table including details of intent training data according to an illustrative embodiment.

FIG. 5 depicts example pseudocode for intent analysis and classification according to an illustrative embodiment.

FIG. 7 depicts example pseudocode for task profiling according to an illustrative embodiment.

DETAILED DESCRIPTION

Figure 1:
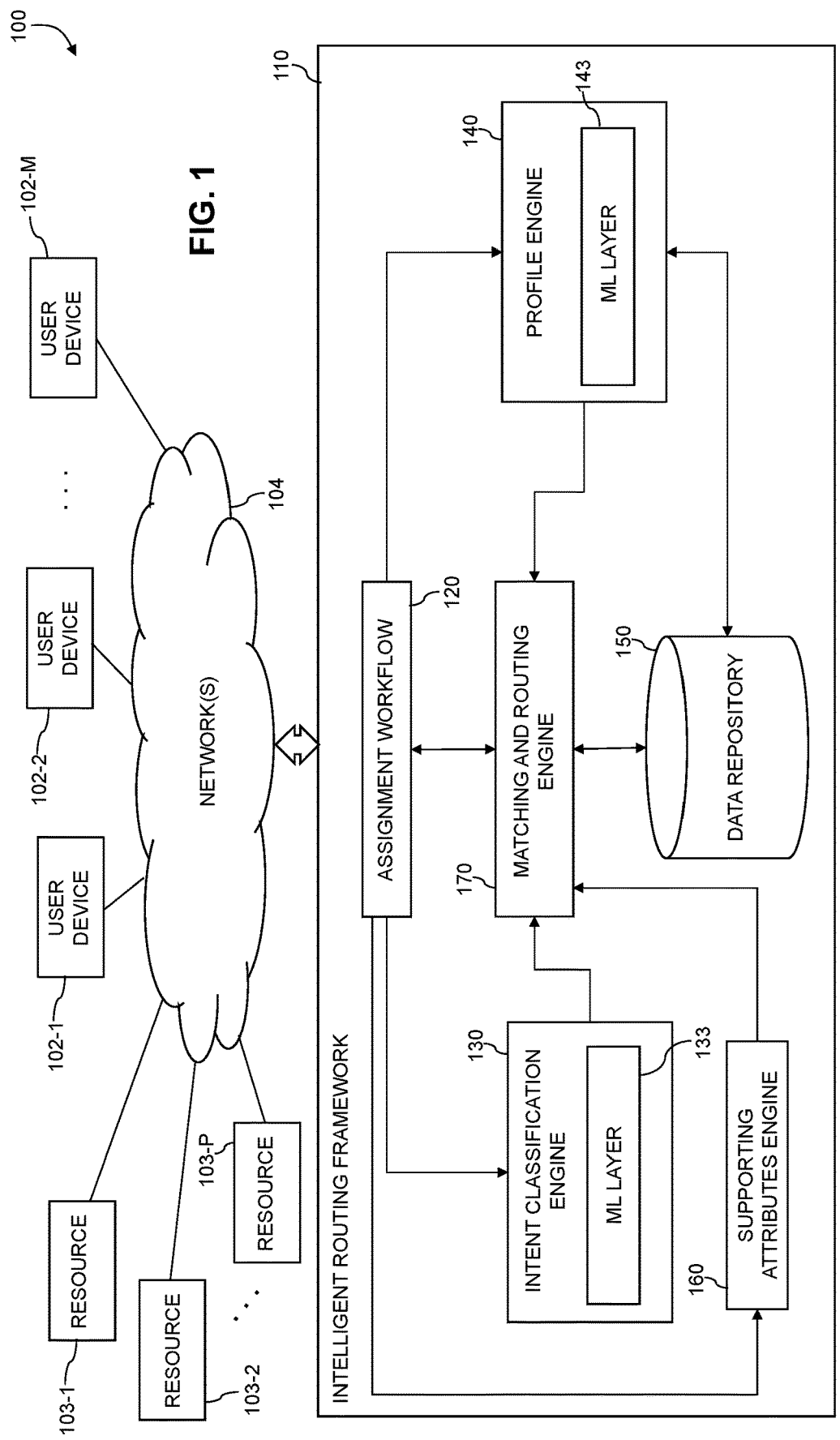
FIG. 1 depicts details of an information processing system with an intelligent routing framework for analyzing incoming tasks and routing the tasks to resources according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

In an illustrative embodiment, machine learning (ML) techniques are used to classify various tasks (also referred to herein as "work items"), and to identify and assign resources to perform the tasks based on various parameters. For example, using one or more ML models, skills and certification data, historical data including, for example, case and incident history, and project statuses are analyzed to accurately match available and suitable resources with work items in a complex enterprise environment. Advantageously, the embodiments use natural language understanding (NLU), neural networks and one or more statistical routing algorithms to provide a universal solution for dynamic assignment of resources, without requiring multiple resource assignment tools and rules engines. The embodiments provide techniques for managing resources in a centralized system, thus allowing for resource optimization across an enterprise.

FIG. 1 shows an information processing system 100 configured in accordance with an illustrative embodiment. The information processing system 100 comprises user devices 102-1, 102-2, ... 102-M (collectively "user devices 102") and resources 103-1, 103-2, ... 103-P (collectively "resources 103"). The user devices 102 and resources 103 communicate over a network 104 with each other and with an intelligent routing framework 110.

The user devices 102 can comprise, for example, Internet of Things (IoT) devices, desktop, laptop or tablet computers, mobile telephones, landline telephones or other types of processing devices capable of communicating with the intelligent routing framework 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise.

The resources 103 can comprise, for example, human agents, virtual agents and/or combinations of human and virtual agents capable of performing one or more tasks. The resources 103 may also comprise, for example, software applications, hardware and/or combinations of software applications and hardware configured to perform one or more tasks. As explained further herein, different resources 103 have different skill sets and/or proficiencies and may be more suitable for performing certain tasks requiring their skill sets and/or proficiencies than other resources 103 not having the skills and/or proficiencies needed for a given task. In an example embodiment, some resources 103 may comprise chatbots or other software applications that can be used to conduct online conversations with users via text or speech to complete one or more tasks, in lieu of providing direct contact with a live human agent. The chatbots simulate a conversational partner, and may be used in connection with, for example, information acquisition, user queries, customer service, technical support and request routing. The chatbots may be executed on one or more processing devices or virtualized computing resources. Alternatively, the resources may comprise a live human agent for users to interact and/or converse with in order to complete tasks. The variables M and P and other similar index variables herein such as K, L, N, S and R are assumed to be arbitrary positive integers greater than or equal to two.

As used herein, the terms "task" or "work item" are to be broadly construed to refer to, for example, any jobs or undertakings performed by an enterprise or other organization on behalf of a customer, patron or other enterprise user. Tasks and/or work items can include, but are not necessarily limited to, support and/or service requests, installation orders, deployment orders, configuration services, help desk orders, technical support items, human resources support items and/or customer relationship management (CRM) items. Although some examples herein are discussed in terms of customer support scenarios and related tasks, the embodiments are not limited thereto and may be applied to different scenarios and or tasks performed on behalf of users associated with an enterprise or other organization.

The terms "client," "customer" or "user" herein are intended to be broadly construed so as to encompass numerous arrangements of human, hardware, software or firmware entities, as well as combinations of such entities. Intelligent conversation services may be provided for users utilizing one or more machine learning models, although it is to be appreciated that other types of infrastructure arrangements could be used. At least a portion of the available services and functionalities provided by the intelligent routing framework 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the intelligent routing framework 110, as well as to support communication between the intelligent routing framework 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the intelligent routing framework 110.

The intelligent routing framework 110 in the present embodiment is assumed to be accessible to the user devices 102, and vice-versa, over the network 104. In addition, the intelligent routing framework 110 and the user devices 102 can access the virtual assistants 103 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The intelligent routing framework 110, on behalf of respective infrastructure tenants each corresponding to one or more users associated with respective ones of the user devices 102, provides a platform for matching resources with enterprise tasks based on a plurality of factors including, for example, skills, availability, task priority and other dynamic dimensions.

Referring to FIG. 1, the intelligent routing framework 110 comprises an assignment workflow layer 120, an intent classification engine 130, a profile engine 140, a data repository 150, a supporting attributes engine 160 and a matching and routing engine 170. The intent classification and profile engines 130 and 140 each include a machine learning (ML) layer 133 and 143, respectively. The intelligent routing framework 110 assigns tasks to individual resources 103 or to pools of resources 103. The framework 110 uses configurable statistical algorithms and a variety of parameters including, but not necessarily limited to, intent, skills, proficiency, availability, task type, task urgency, task severity, etc. to assign work items to the most appropriate resources. The parameters considered for resource assignment are dynamic and configurable, so that the framework 110 can change over time and respond to real-time modifications to work with different resource types and situations.

The intent classification engine 130 uses one or more machine learning algorithms to identify the intent of a task to determine the issues and/or work that a user is facing when initiating a communication about a given matter and inputting a work item request to the intelligent routing framework 110. The profile engine 140 uses one or more machine learning algorithms to analyze historical task data from the data repository 150 to identify, for example, a type of task, the skills needed to perform the task, task urgency and task severity. The supporting attributes engine 160 identifies supporting attributes associated with the tasks, such as, for example, language, region, country, etc., which may be needed for routing a task to an appropriate one of the resources 103. Based on inputs from the intent classification engine 130, the profile engine 140 and the supporting attributes engine 160, the matching and routing engine 170 applies a configurable statistical routing algorithm to identify and match resources with work items.

Figure 2:
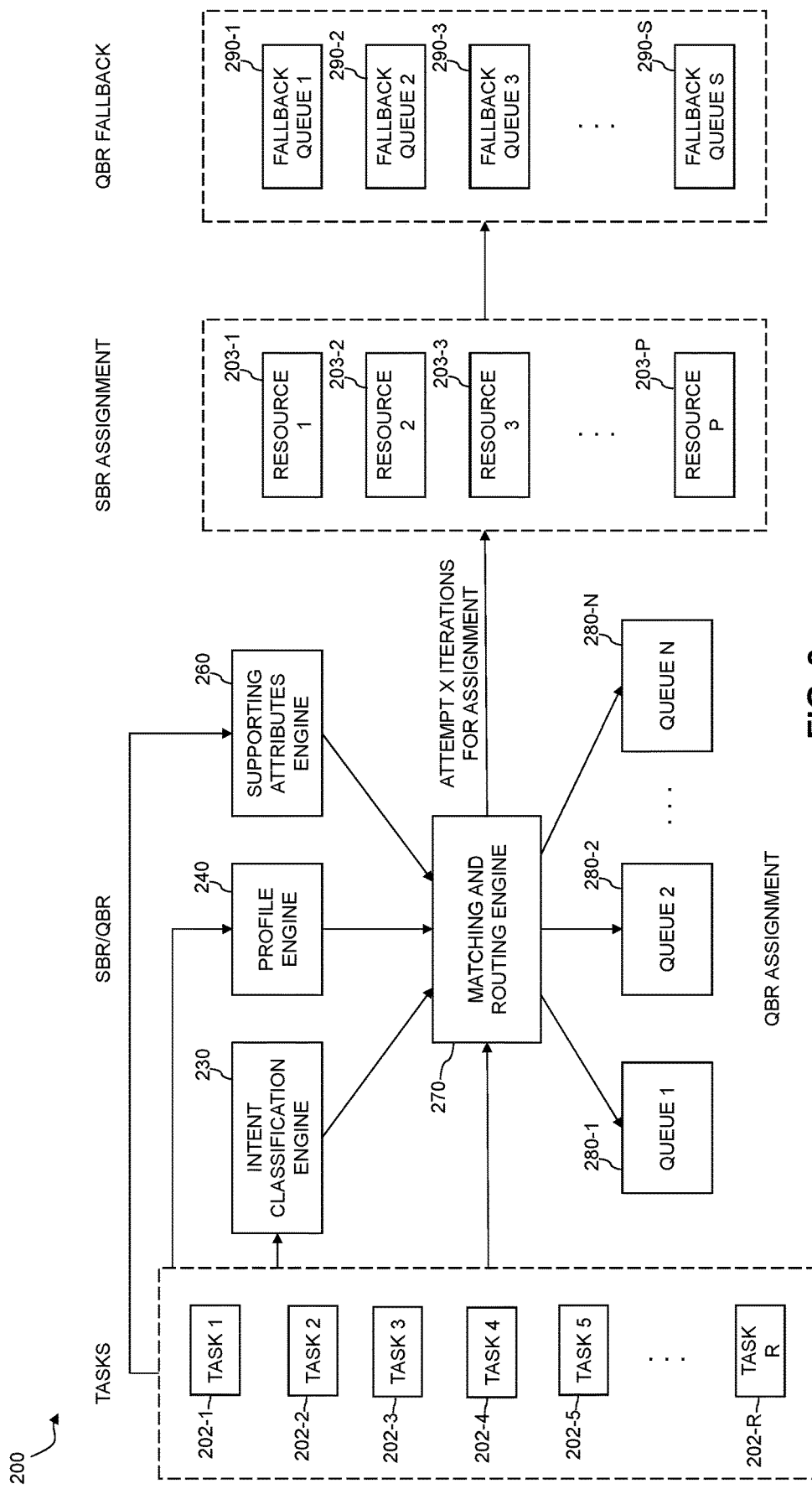
FIG. 2 depicts details of an operational flow for analyzing incoming tasks and routing the tasks to resources according to an illustrative embodiment.

In more detail, referring to FIGS. 1 and 2, tasks 202-1, 202-2, 202-3, 202-4, 202-5 . . . 202-R (collectively "tasks 202") are input to the intent classification engine 230, profile engine 240, supporting attributes engine 260 and matching and routing engine 270 of an intelligent routing framework. In the operational flow 200, the intent classification engine 230, profile engine 240, supporting attributes engine 260 and matching and routing engine 270 may be the same or similar to the intent classification engine 130, profile engine 140, supporting attributes engine 160 and matching and routing engine 170 of an intelligent routing framework 110. The tasks 202 may originate from a plurality of channels accessible to users via, for example, user devices 102 connected to the intelligent routing framework via network(s) 104. The channels may include, for example, online chat, voice, web-to-case, social media and/or email or other messaging channels (e.g., short-message-service (SMS)). Voice channels can be accessed via, for example, mobile or landline telephones, and web-to-case channels may comprise, for example, online forms (e.g., service requests) completed by users and sent to the framework 110. Social media channels may comprise social media sites (e.g., Facebook, Twitter, Yelp, etc.) from which the routing framework 110 may receive or pull data.

The inputted tasks are received via an assignment workflow layer 120, which acts as an input/output interface layer to receive incoming requests (e.g., tasks 202) and output task assignments to the resources 103. The assignment workflow layer 120 provides interfaces for users 202 to access the intelligent routing framework 110 via one or more of the channels. The assignment workflow layer 120 receives and processes incoming requests comprising one or more tasks 202 from users 102 (e.g., via user devices 102). The requests comprise natural language inputs comprising, for example, statements, queries, requests for services (e.g., information technology (IT), human resources (HR)) requests), requests for documents, requests for help/support, requests for information, requests for status, and other types of requests or statements. Some examples of requests are shown in FIG. 3 (e.g., "My laptop gives me a blue screen" (e.g., Blue Screen of Death (BSOD)), "Need a project manager for enterprise storage installation and deployment" and "Need a development resource for the monitoring project"). The assignment workflow layer 120 comprises one or more application programming interfaces (APIs) to interface with the channels and different elements of the intelligent routing framework 110. The assignment workflow layer 120 facilitates interactions between devices of multiple types (e.g., physical, virtual, mobile, desktop) through multiple mediums (e.g., web, cellular, satellite, etc.).

Figure 4:
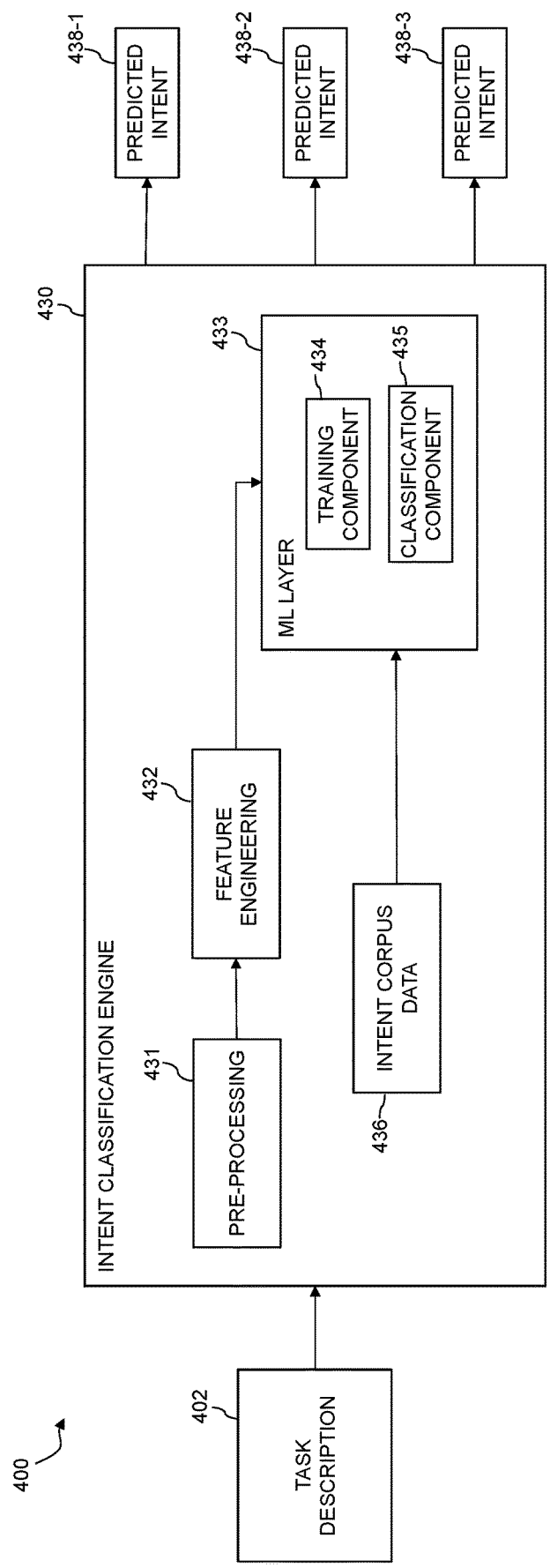
FIG. 4 depicts details of an operational flow for intent classification according to an illustrative embodiment.

Referring to FIGS. 1, 2 and 4, the intent classification engine 130 (which is the same or similar to the intent classification engines 230 and 430) uses NLU and neural networks to analyze incoming dialogs comprising task descriptions 402 to classify task intent. The intent classification engine 130/230/430 is part of the pre-processing steps for a task assignment workflow to assemble input parameters for the matching and routing engine 170/270. In some cases, task intent may not be clearly specified in a dialog, requiring analysis by the intent classification engine 130/230/430 to derive the intent from a work item/task description.

Considering a message comprising a work item is very similar to a time series model where the words come one after another over a period of time, the embodiments base an incoming dialog on a time series model, and leverage a Recurrent Neural Network (RNN). In order to efficiently analyze a message, the embodiments use a bi-directional RNN, which uses two separate processing sequences, one from left to right and another from right to left. In order to address RNNs having exploding or vanishing gradient issues for longer and complex dialogs or messages, the embodiments utilize a bi-directional RNN with long short-term memory (LSTM) for the NLU.

The machine learning model used by the ML layer 133 (or ML layer 433) is a bi-directional with LSTM model. Unlike a traditional neural network, where input and output are independent, in an RNN the output from a previous step feeds into the input of a current step. As a result, when performing language processing, previous words are taken into account when predicting subsequent words of a sentence. An RNN includes a hidden state which remembers one or more words in the sentence. The bi-directional RNN of the embodiments performs bi-directional processing of a sentence (from past and from future in two directions in parallel). A bi-directional RNN addresses problems where sentences are too long, and some previous words in the sentence are not available due to limited hidden states. In addition, LSTM utilized by the embodiments introduces advanced memory units and gates to an RNN to improve accuracy and performance of the machine learning model.

Referring to the operational flow 400 in FIG. 4, intent analysis by the intent classification engine 430 (or intent classification engine 130 or 230) uses intent corpus data 436 to train the machine learning model. This corpus data contains words and/or phrases and the corresponding intent associated with each of the words and/or phrases. A small sample of the intent corpus data used to train the machine learning model is shown in the table 300 in FIG. 3. Referring to the table 300, natural language dialog samples are shown as corresponding to intents related to requests for support or assistance ("support.assist.consumer"), ("service.enterprise.install") and ("it.development.project"). The training data is input to the training component 434 of the ML layer 433 to train the machine learning model.

According to an embodiment, a pre-processing component 431 cleans any unwanted characters and stop words from the corpus data. The pre-processing further comprises stemming and lemmatization, as well as changing text to lower case, removing punctuation, and removing incorrect or unnecessary characters. Once pre-processing and data cleanup is performed, the feature engineering component 432 tokenizes the input list of words in the sentences and/or phrases. Tokenization can be performed using, for example, a Keras library or a natural language toolkit (NLTK) library. A Keras tokenizer class can be used to index the tokens. After tokenization is performed, the resulting words are padded to make the words have equal lengths so that the words can be used in the machine learning model. A list of intents is indexed and fed into the machine model for training. The intents may be one-hot encoded before being input to the model. Some features and/or parameters used in connection with the creation of the bi-directional RNN with LSTM model include an Adam optimizer, Softmax activation function, batch size and a number of epochs. These parameters or features are tuned to get the best performance and accuracy of the model. After the model is trained with the intent corpus training data, the model is used to predict the intent for incoming dialogs and/or messages. The accuracy of the model is calculated for hyperparameter tuning.

Referring to the operational flow 400 for intent classification in FIG. 4, an inputted task description 402 (e.g., a natural language input) is pre-processed and engineered by the pre-processing and feature engineering components 431 and 432, and then input to the ML layer 433 (also ML layer 133 in FIG. 1) so that intent can be classified (e.g., by the classification component 435) using the trained machine learning model to generate predicted intents 438-1, 438-2, 438-3 (collectively "predicted intents 438"). Some non-limiting examples of predicted intents include, for example, support/assistance, service/installation and IT development project, which can be outputs of the operational flow 400. Although three predicted intents are shown in FIG. 4, the embodiments are not necessarily limited thereto, and more or less predicted intents can be generated in connection with a given task description.

FIG. 5 depicts example pseudocode 500 for intent analysis and classification according to an illustrative embodiment. For the implementation of the intent classification engine 130/230/430, Python language and NumPy, Pandas, Keras and NLTK libraries can be used. According to an embodiment, the ML layer 133/433 has a plurality of neurons in the output layer corresponding to the number of intent types/classes being tested.

Figure 6:
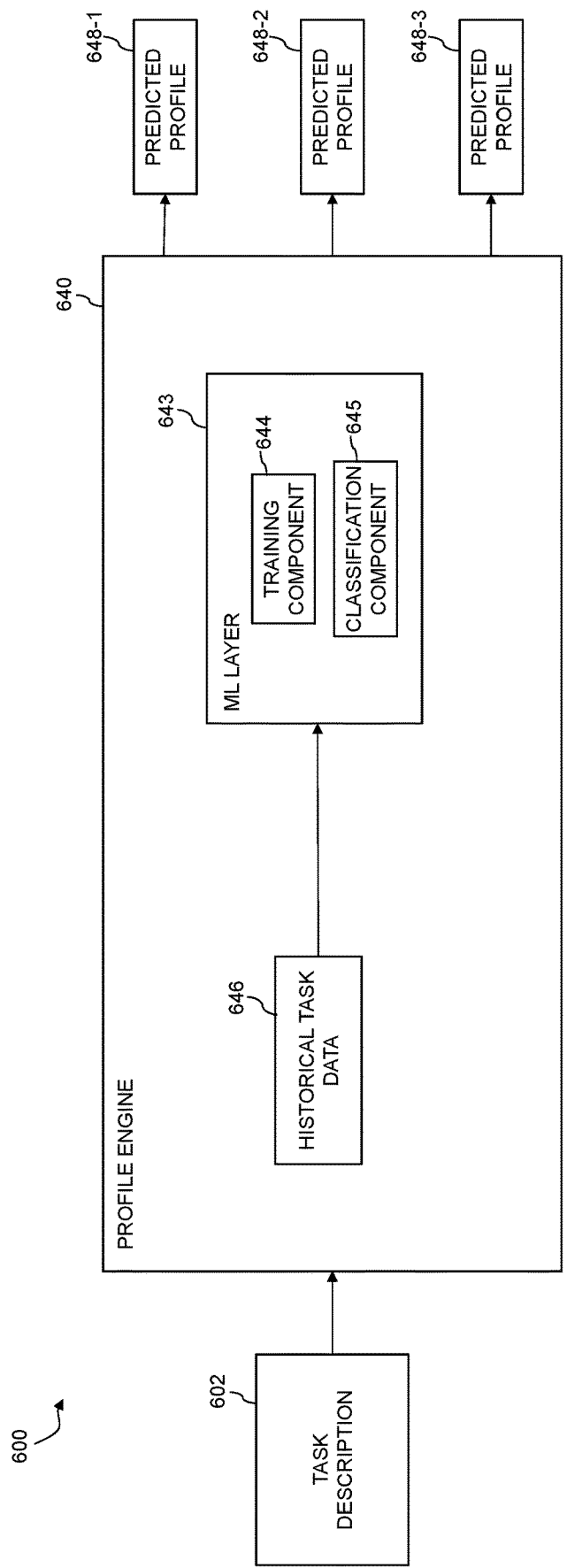
FIG. 6 depicts details of an operational flow for task profiling according to an illustrative embodiment.

Referring to FIGS. 1, 2 and 6, the profile engine 140 (which is the same or similar to the profile engine 240 and 640), determines, for example, the type of a task, skills and proficiency needed to complete the task, the severity of the task and the urgency of the task. For example, a task corresponding to a request to fix an unresponsive device requires different skills and has different urgency than a task requesting developers having a specific computer language expertise to complete a project. In addition, there may be multiple complex skills with variable proficiency levels. The profile engine 140/240/640 recommends skills for a given task based on skills used for past tasks that were successfully completed. Such data for past tasks is stored in the data repository 150. Similarly, the urgency and severity of a task can be derived from historical data, such as, for example, from the number of occurrences of the same problem in the historical work items and the time in which those work items were completed. For example, multiple occurrences of a task that have been resolved may signify a common problem that is less severe and/or urgent. In another example, relatively fast turn-around times to complete historical tasks may indicate that such tasks were more urgent than tasks with longer turn-around times to complete the tasks.

Considering the amount and dimensions of data and skills, the profile engine 140/240/640 uses one or more machine learning models to identify task profiles. The historical data is received from the data repository 150 comprising, for example, historical case resolution and project data, which is used for training the machine learning model used by the profile engine 140/240/640.

In or more embodiments, the profile engine 140/240/640 utilizes a content-based filtering and recommendation algorithm to match an incoming one of the tasks 202 (also task description 602 in FIG. 6) with similar tasks from the historical data and predict the recommended skills necessary for the successful fulfillment of the task, as well as the type, urgency and severity of a given task. For example, in the case of a technical support matter, the profile engine 140/240/640 predicts the skills needed, task type, urgency and severity based on the skills used, task type, number of occurrences and time taken for past resolutions. In another example, in the case of installation projects, the profile engine 140/240/640 recommends the skills needed for the successful completion of the project based on the skills needed to complete the same or similar projects in the historical data, and predicts the project type, urgency and severity based on the task type, number of occurrences and time taken for the same or similar projects in the historical data. The content-based recommendation techniques used by the embodiments use attributes of the stored content (e.g., historical case data and historical incident data associated with similar configurations and issues) to predict similar profiles.

Referring to the operational flow 600 in FIG. 6, in training a machine learning model used by the profile engine 640, the historical task data 646 from a data repository (e.g., data repository 150) is input to a training component 644 of the ML layer 643 (which is the same or similar to the ML layer 143 in FIG. 1). The historical task data 646 comprises, for example, historical case resolution data and historical project data. The training data sets can vary based on different tasks.

Since the inputted task descriptions 602 and historical task data 646 are text-based and the content-based filtering and recommendation algorithm works with numerical data, the inputted task descriptions 602 and historical task data 646 are encoded and/or vectorized before being input to the ML layer 643 for training by the training component 644 and analysis and classification by the classification component 645. In one or more embodiments. one-hot encoding, word embedding and/or Term Frequency, Inverse Document Frequency (TF-IDF) encoding/vectorization may be used perform encoding and/or vectorization.

According to one or more embodiments, the ML layer 643 of the profile engine 640 creates a TF-IDF vectorizer of the task descriptions 602 and historical task data 646. TF-IDF is a numerical statistic in NLP that reflects how important a word is to a document in a collection. In general, the TF-IDF algorithm is used to weigh a keyword in any document and assign an importance to that keyword based on the number of times the keyword appears in the document. Each word or term has its respective TF and IDF score. The product of the TF and IDF scores of a term is referred to as the TF-IDF weight of that term. The higher the TF-IDF weight (also referred to herein as "TF-IDF score"), the rarer and more important the term, and vice versa. It is to be understood that the embodiments are not limited to the use of TF-IDF, and there are alternative methodologies for text vectorization.

In illustrative embodiments, the TF-IDF vectorizer is generated and used to build one or more TF-IDF matrices, which include each word and its TF-IDF score for each attribute in historical task data 646. According to an embodiment, a TfidfVectorizer function from a SciKitLearn library is used to build the vectorizer.

When a user provides a task description 602 in connection with an issue or problem (e.g., task description 602), the description will be used to build another TF-IDF matrix based on the attributes in the description 602. The TF-IDF matrices ignore stop words. The classification component 645 uses a similarity distance algorithm between two generated TF-IDF matrices to find matching attributes between the inputted task description 602 and the historical data 646. The similarity functions are as follows:

*tf*=TfidfVectorizer(analyzer='word';ngram_range=(1, 3),min_*df*=0,stop_words='english')

*df*_attributes['all_content']=*df*_attributes['operating_system']+attributes_list['version_number']+attributes_list['security_patch']+attributes_list['resolution']

tfidf_all_content=*tf*_vectorizer.fit_transform(attributes_list['all_content'])

Once the TF-IDF score of all attributes is calculated, predicted profiles (e.g., predicted profiles 648-1, 648-2 and 648-3) are generated by the classification component 645.

Although three predicted profiles are shown in FIG. 6, the embodiments are not necessarily limited thereto, and more or less predicted profiles can be generated in connection with a given task description. The predicted profiles can be generated using various machine learning techniques such as, for example, similarity algorithms, support vector machines (SVMs), matrix factorization and deep learning. According to one or more embodiments, a similarity-based algorithm such as, for example, a cosine similarity algorithm, a Euclidian distance algorithm and Pearson's correlation algorithm, is used. In an illustrative embodiment, a Pearson's correlation algorithm is used. Pearson's correlation algorithm (also referred to herein as "bi-variate correlation algorithm") is a statistical algorithm to measure the linear correlation between two variables. The variables in this case are attributes of inputted task descriptions 602 and attributes of historical task data 646. Pearson's correlation coefficient can vary between +1 and −1, where +1 is a positive linear correlation, −1 is a negative linear correlation, and 0 represents no linear correlation. The formula (1) for Pearson's correlation is shown below.

$$\text{Pearson}(x, y) = \frac{\sum xy - \frac{\sum x \sum y}{N}}{\sqrt{\left(\sum x^2 - \frac{(\sum x)^2}{N}\right)\left(\sum y^2 - \frac{(\sum y)^2}{N}\right)}} \quad (1)$$

In the formula (1), x and y represent data objects and N represents the number of attributes. FIG. 7 depicts example pseudocode 700 for profile prediction according to an illustrative embodiment. For the implementation of the profile engine 140/240/640, Python language and SciKitLearn and NLTK libraries can be used.

Referring to FIG. 2, the matching and routing engine 270 (which is the same or similar to the matching and routing engine 170) assigns resources 203-1, 203-2, 203-3, . . . 203-P (collectively "resources 203") to tasks based on the outputs of the intent classification engine 230, the profile engine 240 and the supporting attributes engine 260. As noted herein, the intent classification engine 230 (which is the same or similar to the intent classification engines 130 and 430) determines the intents of incoming tasks 202, the profile engine 240 (which is the same or similar to the profile engines 140 and 640) uses historical task information to determine parameters including, for example, type, urgency and severity of a task, and needed skills to complete a task, and the supporting attributes engine 260 (which is the same or similar to the supporting attributes engine 160) identifies supporting attributes associated with incoming tasks 202 such as, for example, language, region, country, etc. to be used when routing tasks 202 to the appropriate resource(s) 203. In connection with the supporting attributes, efficiency can be improved if resources are in the same region or country and speak the same language as a user.

The matching and routing engine 270 is configured to assign and route tasks 202 to various resources 203 based on the skills, proficiencies (e.g., certifications, documented proficiencies) and/or availabilities of the various resources 203, and whether the skills and/or proficiencies needed to complete a work item match with the skills and/or proficiencies of the resources 203. The resources 203 include the same or similar resources as those noted in connection with the resources 103, and may include, for example, technical support agents, field service engineers, deployment engineers, program/project managers and other type of resources utilized to perform and complete tasks.

As shown in FIG. 2, the matching and routing engine 270 computes and assigns resources 203 to tasks 202 based on the inputs from the intent classification, profile and supporting attributes engines 230, 240 and 260. In one or more embodiments, the matching and routing engine 270 routes tasks 202 to individual resources 203 or pools of resources 203 using a routing algorithm that utilizes a combination of queue-based routing (QBR) and skill-based routing (SBR) ("SBR/QBR"). QBR is based on availabilities of the resources 203 and SBR is based on skills and/or proficiencies of the resources 203 and how well the skills and/or proficiencies match with the skills and/or proficiencies needed to perform the tasks 202 identified by the profile engine 240. For example, the routing algorithm may specify use of QBR to route a given task to resources in one of a plurality of fallback queues (e.g., fallback queue 1 290-1, fallback queue 2 290-2, fallback queue 3 290-3, . . . fallback queue-S 290-S (collectively "fallback queues 290") in response to SBR failing to route the given task to one of the resources 203 ("QBR Fallback"). Although not shown, it is to be understood that the fallback queues 290 include resources similar to the resources 103 or 203.

When routing to the resources 203 using SBR ("SBR Assignment") fails due to, for example, unavailability of the resources 203, the resources 203 do not accept the task or for other reasons, the routing algorithm may attempt a specified number of iterations (e.g., "attempt X iterations for assignment") to route the given task to a resource 203 using SBR. If a threshold number of iterations for repeating the routing using SBR is met or a predetermined time for performing the iterations has elapsed without having assigned the given task 202 to a resource 203, the algorithm may specify using QBR instead and route the task to one of the resources in the fallback queues 290. The resources in the fallback queues 290 are assigned without consideration of whether the resources possess the skills and/or proficiencies to perform and complete the given task.

In some embodiments, when selected resources 203 for receiving a given task 202 are not available and routing to such resources 203 fails, the routing algorithm may reduce the number of parameters on which to base the SBR so that more of the resources 203 may be available for selection in an SBR scenario. For example, the profile engine 240 may determine that a particular number of skills (e.g., five skills) is needed to complete a given task 202. However, the resources 203 having all five skills may not currently be available to complete the given task 202. In this case, the routing algorithm may eliminate one or more of the skills to increase the population of resources 203 available for assignment of the given task 202. The reduction of the required skills for assigning resources in an SBR scenario can be performed until an available resource is found or a threshold limiting the reduction to a certain number of skills is met.

In some embodiments, depending on the user and/or the nature of a task, the routing algorithm may require only SBR, and specify that QBR is not an option. This may be the case when the profile engine 240 determines that the task type requires highly skilled resources and cannot be performed by an unskilled resource and/or the severity of the task is high.

In some embodiments, the routing algorithm may specify that certain tasks 202 be assigned to resources using only QBR ("QBR Assignment"), where the tasks are routed to a plurality of queues (e.g., queue 1 280-1, queue 2 280-2, . . . queue-N 280-N (collectively "queues 280"). Although not shown, it is to be understood that the queues 280 include resources similar to the resources 103 or 203. In the case of routing tasks 202 to resources using only QBR, the tasks 202 are routed to resources in the queues 280 based on availability of the resources and not on the skills and/or proficiencies of the resources. The routing algorithm may specify the QBR assignment of resources may be used when the profile engine 240 determines that the skills and/or proficiencies needed to complete a given task are universal or do not meet a specified threshold of complexity to permit assignment to any available resource.

The embodiments permit a routing algorithm used by the matching and routing engine 270 to be customizable to permit enterprises to specify how resources are assigned to tasks. For example, an enterprise can specify resource assignment order. In some non-limiting examples, the routing algorithm may require attempting assignments of resources (i) from a most proficient/skilled resource to a least proficient/skilled resource; (ii) from a least proficient/skilled resource to a most proficient/skilled resource; (iii) based on best match using standard deviation; and/or (iv) based on a round-robin approach. In some embodiments, the routing algorithm attempts to assign tasks to the first available resource with the highest number of skills to perform the task. For example, if a resource is the best match for given task based on the analysis by the intent classification, profile and supporting attributes engines 230, 240 and 260, but is unavailable, the algorithm may specify that the task be routed to next best match that is available to handle the task. In some embodiments, if a resource is suitable and available for multiple tasks, the resource can be assigned the task with which it has the best match of skills and proficiencies.

According to one or more embodiments, the matching and routing engine 270 ranks the resources based on a computed resource score and prioritizes the resources for assignment based on the ranking. In one or more embodiments, in connection with a given task, the resource score is based on a number of skills possessed by a resource which match with the skills determined by the profile engine 240 to be required for the given task. For example, the more matching skills a resource has, the higher the resource score for that resource. In some embodiments, each skill can be weighted according to the importance of the skill, where skills considered to be more important for completing the given task and/or identified has being given higher priority are given higher weights. The matching and routing engine 270 computes resource score according one or more of the following equations (2) and (3):

$$\text{Resource Score} = (\text{Resource\_Skill\_1} * \text{Skill\_1\_Weight}) + (\text{Resource\_Skill\_2} * \text{Skill\_2\_Weight}) + \ldots (\text{Resource\_Skill\_Z} * \text{Skill\_Z\_Weight}) \quad (2)$$

$$\text{Resource Score} = \text{Resource\_Skill\_1} + \text{Resource\_Skill\_2} + \ldots \text{Resource\_Skill\_Z} \quad (3)$$

In equations (2) and (3) Resource_Skill represents a skill possessed by a resource which matches with the skills determined by the profile engine 240 to be required for a given task, and Z is an integer. In equation (2), Skill_Weight represents a specified weight of the corresponding skill.

According to an embodiment, the matching and routing engine 270 ranks resources 203 according to resource score from a highest resource score to a lowest resource score and, when using SBR, attempts to route a given task 202 to the resource having the highest rank. If the resource with the highest rank is not available, the matching and routing engine 270 attempts to route the task to the next highest ranking resource and so on. In some cases, the matching and routing engine 270 repeatedly attempts to route the task to the highest ranking resource until the highest ranking resource becomes available or a threshold number of iterations for repeating the routing is met or a predetermined time for performing the iterations has elapsed. After the threshold is met, the matching and routing engine 270 attempts to route the task to the next highest ranking resource. Routing and routing attempts to resources are performed by an assignment workflow layer (e.g., assignment workflow layer 120). In one or more embodiments, the matching and routing engine 270 comprises an API to support external routing, can provide a list of qualifying resources for a set of skills and/or attributes for a particular channel, and a vertical or horizontal segment.

Figure 8:
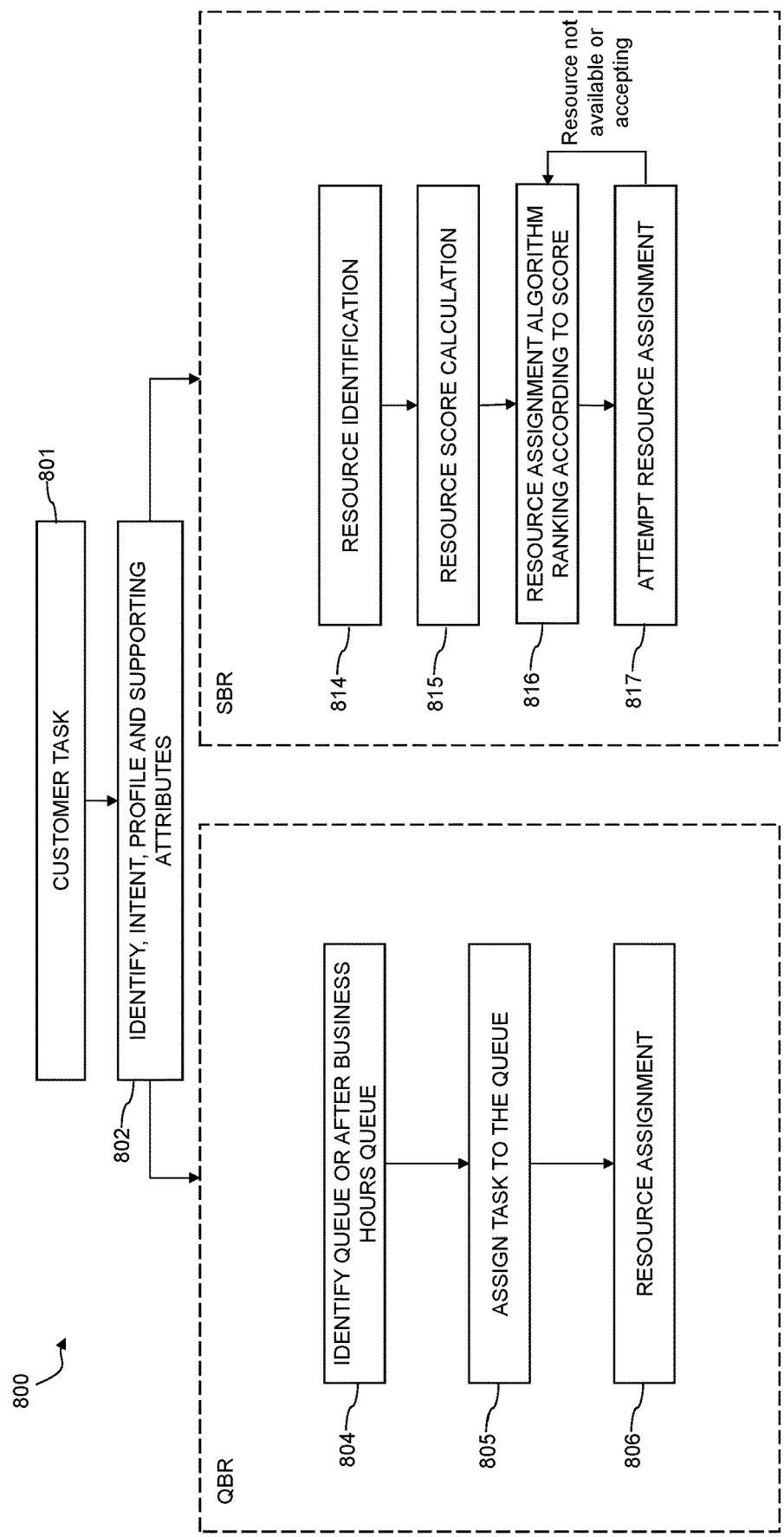
FIG. 8 depicts details of an operational flow for analyzing incoming tasks and routing the tasks to resources according to an illustrative embodiment.

Referring to the operational flow 800 in FIG. 8, at block 801, an incoming task through one or more the communication channels as described herein is received and, at block 802, the intent, profile and supporting attributes of the task are determined by the intent classification, profile and supporting attributes engines.

The flow 800 in FIG. 8 illustrates routing to resources using QBR and SBR. In the QBR flow, at block 804, an available resource queue is identified and selected or an available after business hours queue is selected. At blocks 805 and 806, the task is assigned to the selected queue and then assigned to a resource in the queue.

In the SBR flow, at blocks 814 and 815, resources with matching skills to perform the task are identified and resource scores are calculated for the identified resources. At blocks 816 and 817, the resource assignment algorithm ranks the resources according their resource scores and attempts resource assignment based on the ranking. If the resource for which assignment is attempted is not available or accepting the task, the flow returns to the ranking and attempts to assign the task to next resource in the ranking.

According to one or more embodiments, databases, repositories (e.g., repositories 150, 646), stores and/or corpuses (e.g., corpus 436) used by the intelligent routing framework 110 can be configured according to a relational database management system (RDBMS) (e.g., PostgreSQL). Databases, repositories, stores and/or corpuses in some embodiments are implemented using one or more storage systems or devices associated with the intelligent routing framework 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the intelligent routing framework 110, the assignment workflow layer 120, the intent classification engine 130, the profile engine 140, the data repository 150, the supporting attributes engine 160 and the matching and routing engine 170 in other embodiments can be implemented at least in part externally to the intelligent routing framework 110, for example, as stand-alone servers, sets of servers or other types of systems coupled to the network 104. For example, the assignment workflow layer 120, the intent classification engine 130, the profile engine 140, the data repository 150, the supporting attributes engine 160 and/or the matching and routing engine 170 may be provided as cloud services accessible by the intelligent routing framework 110.

The assignment workflow layer 120, the intent classification engine 130, the profile engine 140, the data repository 150, the supporting attributes engine 160 and the matching and routing engine 170 in the FIG. 1 embodiment are each assumed to be implemented using at least one processing device. Each such processing device generally comprises at least one processor and an associated memory, and implements one or more functional modules for controlling certain features of the assignment workflow layer 120, the intent classification engine 130, the profile engine 140, the data repository 150, the supporting attributes engine 160 and/or the matching and routing engine 170.

At least portions of the intelligent routing framework 110 and the components thereof may be implemented at least in part in the form of software that is stored in memory and executed by a processor. The intelligent routing framework 110 and the components thereof comprise further hardware and software required for running the intelligent routing framework 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the assignment workflow layer 120, the intent classification engine 130, the profile engine 140, the data repository 150, the supporting attributes engine 160, the matching and routing engine 170 and other components of the intelligent routing framework 110 in the present embodiment are shown as part of the intelligent routing framework 110, at least a portion of the assignment workflow layer 120, the intent classification engine 130, the profile engine 140, the data repository 150, the supporting attributes engine 160, the matching and routing engine 170 and other components of the intelligent routing framework 110 in other embodiments may be implemented on one or more other processing platforms that are accessible to the intelligent routing framework 110 over one or more networks. Such components can each be implemented at least in part within another system element or at least in part utilizing one or more stand-alone components coupled to the network 104.

It is assumed that the intelligent routing framework 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the assignment workflow layer 120, the intent classification engine 130, the profile engine 140, the data repository 150, the supporting attributes engine 160, the matching and routing engine 170 and other components of the intelligent routing framework 110, and the elements thereof can each be implemented in the form of one or more LXCs running on one or more VMs. Other arrangements of one or more processing devices of a processing platform can be used to implement the assignment workflow layer 120, the intent classification engine 130, the profile engine 140, the data repository 150, the supporting attributes engine 160 and the matching and routing engine 170, as well as other components of the intelligent routing framework 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the intelligent routing framework 110 to reside in different data centers. Numerous other distributed implementations of the intelligent routing framework 110 are possible.

Accordingly, one or each of the assignment workflow layer 120, the intent classification engine 130, the profile engine 140, the data repository 150, the supporting attributes engine 160, the matching and routing engine 170 and other components of the intelligent routing framework 110 can each be implemented in a distributed manner so as to comprise a plurality of distributed components implemented on respective ones of a plurality of compute nodes of the intelligent routing framework 110.

It is to be appreciated that these and other features of illustrative embodiments are presented by way of example only, and should not be construed as limiting in any way.

Accordingly, different numbers, types and arrangements of system components such as the assignment workflow layer 120, the intent classification engine 130, the profile engine 140, the data repository 150, the supporting attributes engine 160, the matching and routing engine 170 and other components of the intelligent routing framework 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the intelligent routing framework can be offered to cloud infrastructure customers or other users as part of FaaS, CaaS and/or PaaS offerings.

Figure 9:
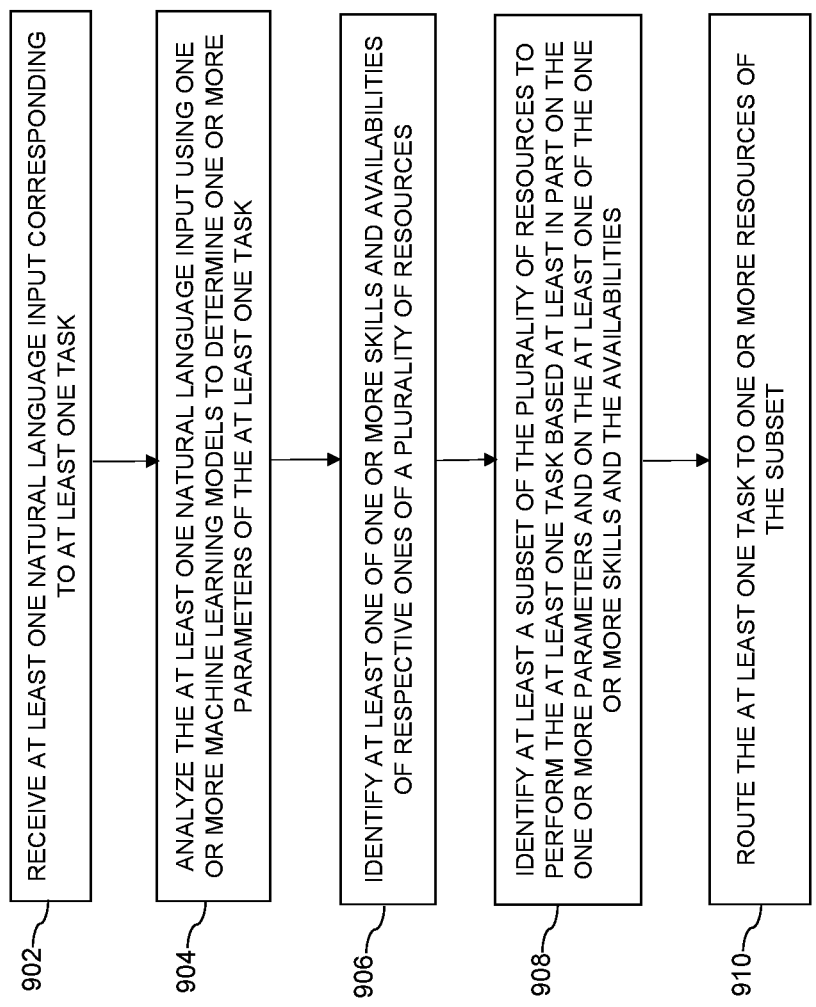
FIG. 9 depicts a process for analyzing incoming tasks and routing the tasks to resources according to an illustrative embodiment.

The operation of the information processing system 100 will now be described in further detail with reference to the flow diagram of FIG. 9. With reference to FIG. 9, a process 900 for analyzing incoming tasks and routing the tasks to resources as shown includes steps 902 through 910, and is suitable for use in the system 100 but is more generally applicable to other types of information processing systems comprising an intelligent routing framework configured for analyzing incoming tasks and routing the tasks to resources.

In step 902, at least one natural language input corresponding to at least one task is received. In step 904, the at least one natural language input is analyzed using one or more machine learning models to determine one or more parameters of the at least one task. In an embodiment, the one or more parameters comprise an intent of the at least one task, and the analyzing comprises performing NLU processing using one or more neural networks to classify the intent of the at least one task.

In step 906, at least one of one or more skills and availabilities of respective ones of a plurality of resources are identified. In step 908, at least a subset of the plurality of resources to perform the at least one task based is identified. The identification of the subset is based at least in part on the one or more parameters and on the at least one of the one or more skills and availabilities.

In step 910, the at least one task is routed to one or more resources of the subset. The routing of the at least one task is based at least in part on a customizable routing algorithm utilizing a combination of QBR based on availabilities of respective ones of resources in the subset and SBR based on one or more skills of the respective ones of the resources in the subset. The customizable routing algorithm specifies use of QBR to route the at least one task to the one or more resources of the subset responsive to SBR failing to route the at least one task to the one or more resources of the subset. In one or more embodiments, the customizable routing algorithm reduces a number of the parameters on which to base the identification of the subset responsive to unavailability of the one or more resources of the subset.

In an embodiment, the one or more parameters comprise one or more skills needed to perform the at least one task, and the analyzing comprises comparing the at least one natural language input to a plurality of historical tasks, and matching the at least one natural language input with one or more of the plurality of historical tasks to determine the one or more skills needed to perform the at least one task. The matching is performed using a content-based filtering and recommendation machine learning algorithm comprising a bi-variate correlation algorithm.

In an embodiment, the one or more parameters comprise at least one of a severity and an urgency of the at least one task, and the analyzing comprises comparing the at least one natural language input to a plurality of historical tasks, matching the at least one natural language input with one or more of the plurality of historical tasks, and determining at least one of a number of occurrences of and a time to complete the one or more of the plurality of historical tasks. The severity and/or the urgency are based at least in part on the number of occurrences of and/or the time to complete the one or more of the plurality of historical tasks.

In an embodiment, the one or more parameters comprise one or more skills needed to perform the at least one task, and respective ones of resources in the subset comprise one or more skills matching with the one or more skills needed to perform the at least one task. A resource score for the respective ones of resources in the subset is computed based at least in part on a number of the one or more skills matching with the one or more skills needed to perform the at least one task. The resources in the subset are ranked based at least in part on the computed resource scores.

In an embodiment, the routing of the at least one task comprises routing the at least one task to a highest ranking resource in the subset having a highest computed resource score. The process may further comprise determining that the highest ranking resource is not available, and routing the at least one task to another resource in the subset having an equal or next highest ranking and/or repeating the routing of the at least one task to the highest ranking resource until the highest ranking resource becomes available or a threshold number of iterations for repeating the routing is met.

It is to be appreciated that the FIG. 9 process and other features and functionality described above can be adapted for use with other types of information systems configured to execute task routing services in an intelligent routing framework or other type of platform.

The particular processing operations and other system functionality described in conjunction with the flow diagram of FIG. 9 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an intelligent routing framework as disclosed herein can provide a number of significant advantages relative to conventional arrangements. For example, unlike conventional techniques, the embodiments advantageously use machine learning techniques to analyze incoming natural language inputs and route tasks to appropriate resources. The framework includes pre-processing capabilities to compute intent and types of tasks, as well as the skills and proficiencies needed to perform the tasks. The computed parameters are input to a routing and matching engine configured to perform optimal matching of resources to the work items. The framework capabilities are pluggable, such that external systems or APIs that can process tasks to extract the parameters can work with the framework.

Conventional approaches rely on non-standardized, separate assignment systems, which create hindrances to resource optimization goals in an enterprise, and result in redundant implementation of the same capabilities. The conventional techniques cause inaccurate and uneven resource assignments due to the use of multiple systems with heterogeneous rules. As a result, long-term operational costs are incurred and non-standard architectures are proliferated. Unlike conventional approaches, the intelligent routing framework provides for management of resources in a centralized system, thus allowing the optimization across an enterprise. The centralized system classifies various tasks, and assigns resources to the tasks based on various optimized matching parameters.

Advantageously, the embodiments provide a scalable and flexible framework that supports a hybrid model of QBR and SBR based resource assignment, as well as exact and partial matching of resource skills and other attributes with tasks. The embodiments further allow for customizable routing algorithms and resource score computation and ranking, and support different communication channels (e.g., chat, email, online portals, voice and social media). The framework includes components that can derive the intents and types of the tasks using NLP algorithms and neural networks. As an additional advantage, the framework also includes components that can derive task profiles including needed skills and proficiencies and determine task urgency, severity and type based on historical task data. A profile engine utilizes a machine learning model trained with the historical tasks that resulted in successful outcomes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the intelligent routing framework 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an intelligent routing framework in illustrative embodiments. These and other cloud-based systems in illustrative embodiments can include object stores.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
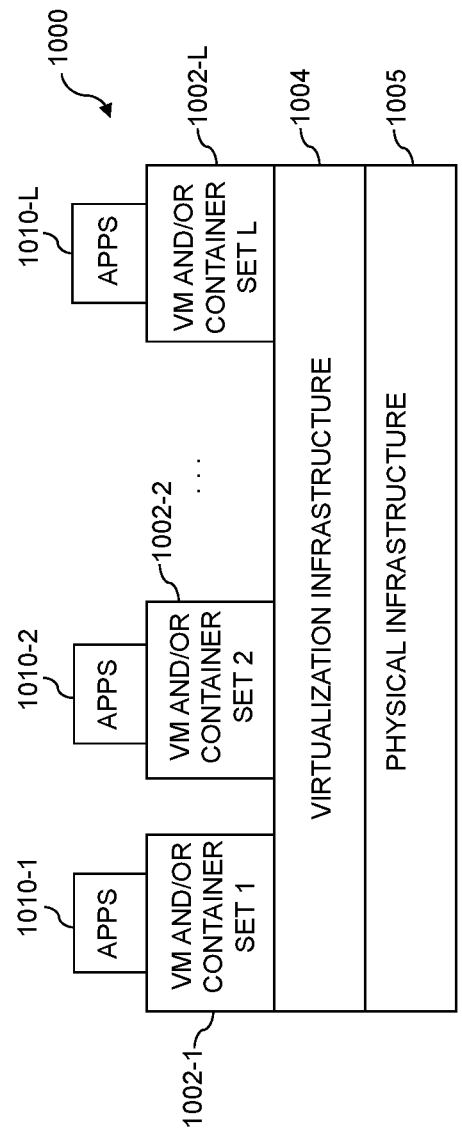
FIGS. 10 and 11 show examples of processing platforms that may be utilized to implement at least a portion of an information processing system according to illustrative embodiments.
Figure 11:
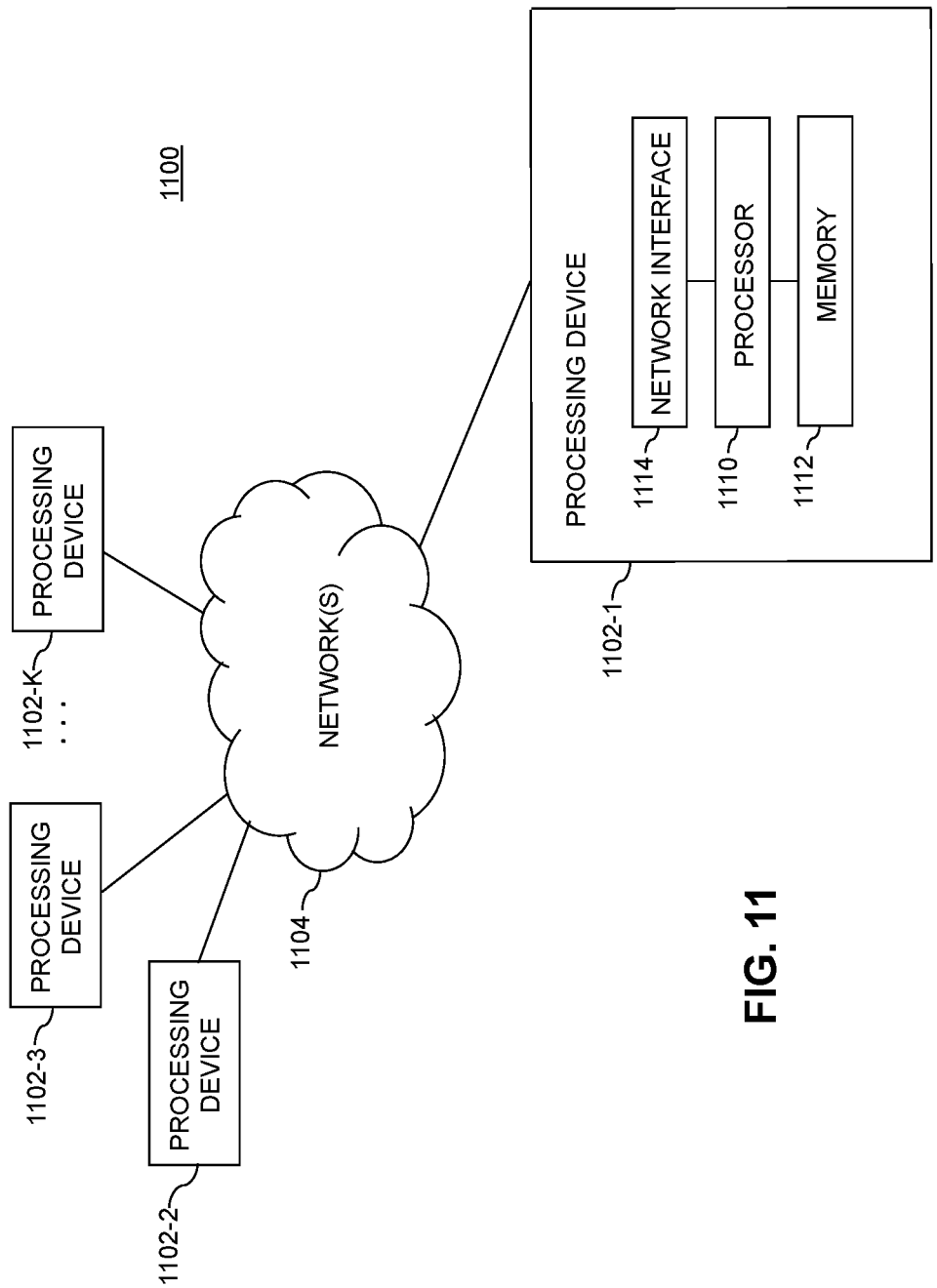

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating_system level virtualization infrastructure. The operating_system level virtualization infrastructure illustratively comprises kernel control groups of a Linux operating system or other type of operating_system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating_system level virtualization functionality, such as support for Docker containers running on bare metal hosts, or Docker containers running on VMs. The containers are illustratively implemented using respective kernel control groups of the operating_system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112. The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the intelligent routing framework 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and intelligent routing frameworks. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
receiving at least one natural language input corresponding to at least one task;
analyzing the at least one natural language input using one or more machine learning models to determine one or more parameters of the at least one task;
identifying at least one of one or more skills and availabilities of respective ones of a plurality of resources, wherein the plurality of resources comprise a plurality of computing resources;
identifying at least a subset of the plurality of resources to perform the at least one task based at least in part on the one or more parameters and on the at least one of the one or more skills and the availabilities; and
routing the at least one task to one or more resources of the subset, wherein the routing comprises:
transmitting the at least one task to a first computing resource of the one or more resources via one or more application programming interfaces, wherein the at least one task is transmitted with one or more requests for a computing resource receiving the at least one task to execute one or more computing operations associated with the at least one task;
determining whether the routing of the at least one task to the first computing resource has failed;
identifying a second computing resource of the one or more resources to which to route the at least one task in response to determining that the routing of the at least one task to the first computing resource has failed; and
transmitting the at least one task with the one or more requests to the second computing resource via the one or more application programming interfaces;
wherein the one or more parameters comprise at least an intent of the at least one task and one or more skills needed to perform the at least one task;
wherein the analyzing comprises:
performing natural language processing using one or more neural networks to classify the intent of the at least one task; and
using a content-based machine learning algorithm to compare the at least one natural language input to a plurality of historical tasks, and to match the at least one natural language input with one or more of the plurality of historical tasks to determine the one or more skills needed to perform the at least one task;
wherein the routing further comprises inputting at least a result of classifying the intent of the at least one task and the one or more skills needed to perform the at least one task to a routing engine, the routing engine routing the at least one task to the one or more resources of the subset based at least in part on the result of classifying the intent of the at least one task and the one or more skills needed to perform the at least one task; and
wherein the steps of the method are executed by a processing device operatively coupled to a memory.

2. The method of claim 1 wherein:
the routing of the at least one task is based at least in part on a customizable routing algorithm; and
the customizable routing algorithm utilizes a combination of queue-based routing based on availabilities of respective ones of resources in the subset and skill-based routing based on one or more skills of the respective ones of the resources in the subset.

3. The method of claim 2 wherein the customizable routing algorithm specifies use of the queue-based routing to route the at least one task to the one or more resources of the subset responsive to the skill-based routing failing to route the at least one task to the one or more resources of the subset.

4. The method of claim 1 wherein:
the routing of the at least one task is based at least in part on a customizable routing algorithm; and
the customizable routing algorithm reduces a number of the parameters on which to base the identification of the subset responsive to unavailability of the one or more resources of the sub set.

5. The method of claim 1 wherein the content-based machine learning algorithm comprises a content-based filtering and recommendation machine learning algorithm.

6. The method of claim 5 wherein the content-based filtering and recommendation machine learning algorithm comprises a bi-variate correlation algorithm.

7. The method of claim 1 wherein:
the one or more parameters further comprise at least one of a severity and an urgency of the at least one task; and
the analyzing comprises:
matching the at least one natural language input with additional ones of the plurality of historical tasks; and
determining at least one of a number of occurrences of and a time to complete the additional ones of the plurality of historical tasks, wherein at least one of the severity and the urgency are based at least in part on at least one of the number of occurrences of and the time to complete the one or more of the plurality of historical tasks.

8. The method of claim 1 wherein
respective ones of resources in the subset comprise one or more skills matching with the one or more skills needed to perform the at least one task.

9. The method of claim 8 further comprising:
computing a resource score for the respective ones of resources in the subset based at least in part on a number of the one or more skills matching with the one or more skills needed to perform the at least one task; and
ranking the resources in the subset based at least in part on the computed resource scores.

10. The method of claim 9 wherein the routing of the at least one task comprises routing the at least one task to a highest ranking resource in the subset having a highest computed resource score.

11. The method of claim 10 wherein the routing of the at least one task further comprises:
determining that the highest ranking resource is not available; and
routing the at least one task to another resource in the subset having an equal or next highest ranking.

12. The method of claim 10 wherein the routing of the at least one task further comprises:
determining that the highest ranking resource is not available; and
repeating the routing of the at least one task to the highest ranking resource until the highest ranking resource becomes available or a threshold number of iterations for repeating the routing is met.

13. An apparatus comprising:
a processing device operatively coupled to a memory and configured:
to receive at least one natural language input corresponding to at least one task;
to analyze the at least one natural language input using one or more machine learning models to determine one or more parameters of the at least one task;
to identify at least one of one or more skills and availabilities of respective ones of a plurality of resources, wherein the plurality of resources comprise a plurality of computing resources;
to identify at least a subset of the plurality of resources to perform the at least one task based at least in part on the one or more parameters and on the at least one of the one or more skills and the availabilities; and
to route the at least one task to one or more resources of the subset, wherein, in routing the at least one task to the one or more resources, the processing device is configured:
to transmit the at least one task to a first computing resource of the one or more resources via one or more application programming interfaces, wherein the at least one task is transmitted with one or more requests for a computing resource receiving the at least one task to execute one or more computing operations associated with the at least one task;
to determine whether the routing of the at least one task to the first computing resource has failed;
to identify a second computing resource of the one or more resources to which to route the at least one task in response to determining that the routing of the at least one task to the first computing resource has failed; and
to transmit the at least one task with the one or more requests to the second computing resource via the one or more application programming interfaces, wherein the one or more parameters comprise at least an intent of the at least one task and one or more skills needed to perform the at least one task;
wherein the analyzing comprises:
performing natural language processing using one or more neural networks to classify the intent of the at least one task; and
using a content-based machine learning algorithm to compare the at least one natural language input to a plurality of historical tasks, and to match the at least one natural language input with one or more of the plurality of historical tasks to determine the one or more skills needed to perform the at least one task: and
wherein, in routing the at least one task to the one or more resources, the processing device is further configured to input at least a result of classifying the intent of the at least one task and the one or more skills needed to perform the at least one task to a routing engine, the routing engine routing the at least one task to the one or more resources of the subset based at least in part on the result of classifying the intent of the at least one task and the one or more skills needed to perform the at least one task.

14. The apparatus of claim 13 wherein:
the routing of the at least one task is based at least in part on a customizable routing algorithm; and
the customizable routing algorithm utilizes a combination of queue-based routing based on availabilities of respective ones of resources in the subset and skill-based routing based on one or more skills of the respective ones of the resources in the subset.

15. The apparatus of claim 14 wherein the customizable routing algorithm specifies use of the queue-based routing to route the at least one task to the one or more resources of the subset responsive to the skill-based routing failing to route the at least one task to the one or more resources of the subset.

16. The apparatus of claim 13 wherein:
the routing of the at least one task is based at least in part on a customizable routing algorithm; and
the customizable routing algorithm reduces a number of the parameters on which to base the identification of the subset responsive to unavailability of the one or more resources of the sub set.

17. An article of manufacture comprising a non-transitory processor-readable storage medium having stored therein program code of one or more software programs, wherein the program code when executed by at least one processing device causes said at least one processing device to perform the steps of:
receiving at least one natural language input corresponding to at least one task;
analyzing the at least one natural language input using one or more machine learning models to determine one or more parameters of the at least one task;
identifying at least one of one or more skills and availabilities of respective ones of a plurality of resources, wherein the plurality of resources comprise a plurality of computing resources;
identifying at least a subset of the plurality of resources to perform the at least one task based at least in part on the one or more parameters and on the at least one of the one or more skills and the availabilities; and
routing the at least one task to one or more resources of the subset, wherein, in routing the at least one task to the one or more resources, the program code causes said at least one processing device to perform the steps of:
transmitting the at least one task to a first computing resource of the one or more resources via one or more application programming interfaces, wherein the at least one task is transmitted with one or more requests for a computing resource receiving the at least one task to execute one or more computing operations associated with the at least one task;
determining whether the routing of the at least one task to the first computing resource has failed;
identifying a second computing resource of the one or more resources to which to route the at least one task in response to determining that the routing of the at least one task to the first computing resource has failed; and
transmitting the at least one task with the one or more requests to the second computing resource via the one or more application programming interfaces;
wherein the one or more parameters comprise at least an intent of the at least one task and one or more skills needed to perform the at least one task;
wherein the analyzing comprises:
performing natural language processing using one or more neural networks to classify the intent of the at least one task; and
using a content-based machine learning algorithm to compare the at least one natural language input to a plurality of historical tasks, and to match the at least one natural language input with one or more of the plurality of historical tasks to determine the one or more skills needed to perform the at least one task; and wherein, in routing the at least one task to the one or more resources, the program code further causes said at least one processing device to perform the step of inputting at least a result of classifying the intent of the at least one task and the one or more skills needed to perform the at least one task to a routing engine, the routing engine routing the at least one task to the one or more resources of the subset based at least in part on the result of classifying the intent of the at least one task and the one or more skills needed to perform the at least one task.

18. The article of manufacture of claim 17 wherein:

the routing of the at least one task is based at least in part on a customizable routing algorithm; and the customizable routing algorithm utilizes a combination of queue-based routing based on availabilities of respective ones of resources in the subset and skill-based routing based on one or more skills of the respective ones of the resources in the subset.

19. The article of manufacture of claim 17 wherein respective ones of resources in the subset comprise one or more skills matching with the one or more skills needed to perform the at least one task.

20. The article of manufacture of claim 19 wherein the program code further causes said at least one processing device to perform the steps of:

computing a resource score for the respective ones of resources in the subset based at least in part on a number of the one or more skills matching with the one or more skills needed to perform the at least one task; and ranking the resources in the subset based at least in part on the computed resource scores.

\* \* \* \* \*